United States Patent [19]

Thompson et al.

[11] 4,158,558
[45] Jun. 19, 1979

[54] POTASSIUM POLYPHOSPHATE FERTILIZERS

[75] Inventors: William H. Thompson; Ralph E. Worthington; Thomas N. Somers, all of Dublin, Ireland

[73] Assignee: Pennzoil Company, Houston, Tex.

[21] Appl. No.: 890,949

[22] Filed: Mar. 28, 1978

Related U.S. Application Data

[63] Continuation of Ser. No. 667,776, Mar. 17, 1976, abandoned, Continuation-in-part of Ser. No. 509,063, Sep. 25, 1974, abandoned.

[51] Int. Cl.² .................................................. C05B 1/06
[52] U.S. Cl. .................................................. 71/34; 71/36; 71/41; 71/47; 71/64 C
[58] Field of Search .................... 71/33, 34, 41, 36, 47, 71/64 C; 423/313

[56] References Cited

U.S. PATENT DOCUMENTS

| | | | |
|---|---|---|---|
| 1,456,831 | 5/1923 | Ross et al. ............................ | 423/313 |
| 3,347,656 | 10/1967 | Potts et al. ........................... | 71/41 X |
| 3,455,649 | 7/1969 | Bigot ................................... | 71/34 X |
| 3,547,615 | 12/1970 | Backham .............................. | 71/34 |
| 3,554,729 | 1/1971 | Curless ................................ | 71/34 |
| 3,607,213 | 9/1971 | Jerzy et al. .......................... | 71/41 X |
| 3,697,246 | 10/1972 | Drechsel et al. ..................... | 71/34 |
| 3,784,367 | 1/1974 | Moore ................................. | 71/34 X |

FOREIGN PATENT DOCUMENTS

818945 12/1974 Belgium.

OTHER PUBLICATIONS

E. V. Brizke et al., *Journal of Chemical Industry,* 1930.

*Primary Examiner*—Robert H. Spitzer
*Attorney, Agent, or Firm*—Lowe, King, Price & Becker

[57] ABSTRACT

A process for the production of a potassium polyphosphate liquid fertilizer in which potassium chloride is reacted with phosphoric acid or polyphosphoric acid in a specific molar ratio, steam, air or other inert gas being blown through the reaction mixture to facilitate removal of hydrochloric acid. The reaction product is dissolved in water or a weak solution, of a liquid ferilizer, the pH adjusted and the resulting solution or slurry is suitable for direct use as a solution fertilizer.

21 Claims, 1 Drawing Figure

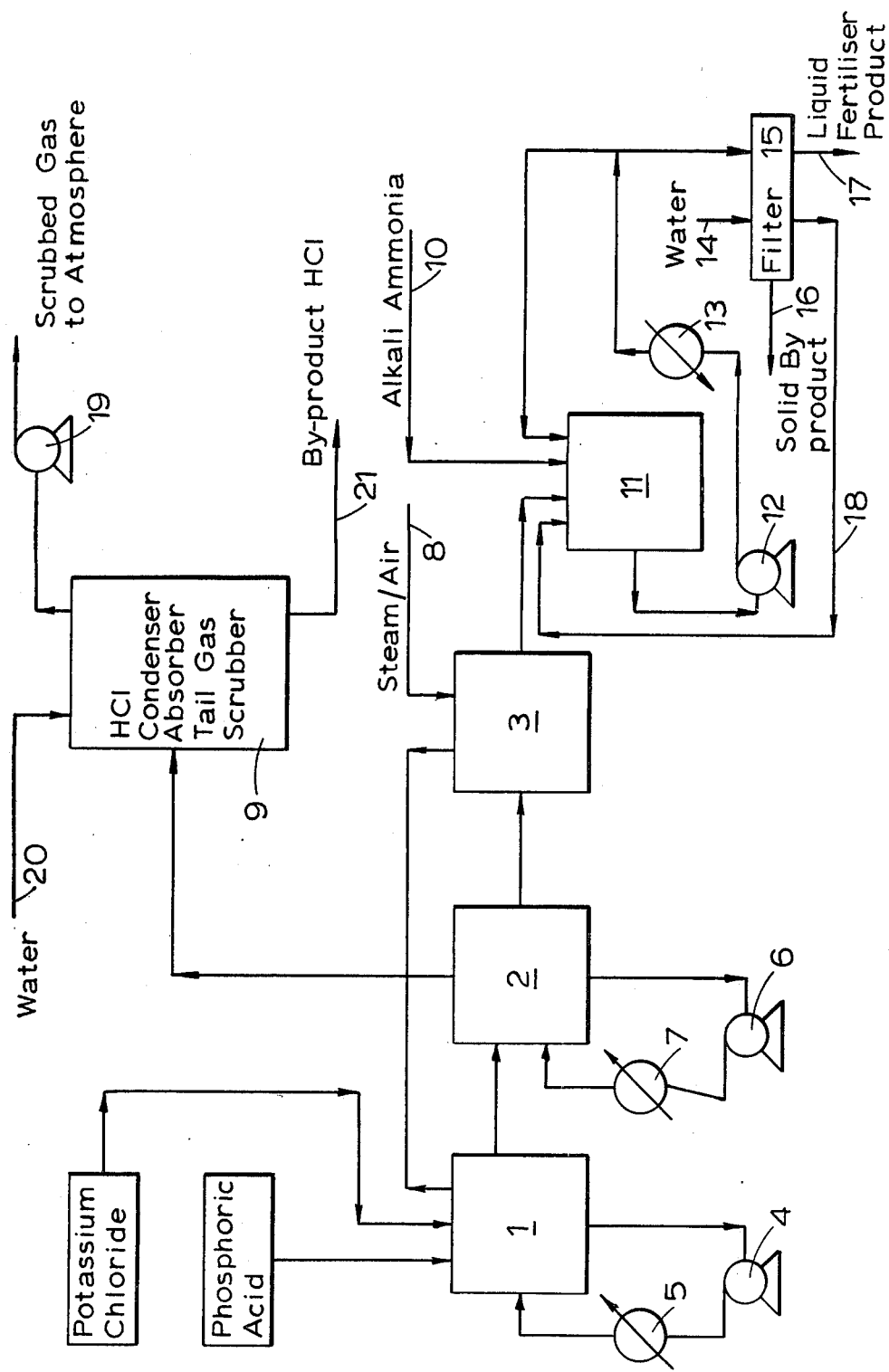

POTASSIUM POLYPHOSPHATE FERTILIZERS

DESCRIPTION OF THE INVENTION

This application is a continuation of U.S. Ser. No. 667,776, filed Mar. 17, 1976, now abandoned, which application is a continuation-in-part of U.S. Ser. No. 509,063, filed Sept. 25, 1974 and now abandoned.

This invention relates to the production of fertilisers and is particularly concerned with the production of potassium polyphosphates. Potassium polyphosphates are of great value as sources of both phosphorus and potassium particularly in liquid fertilisers.

The level of analysis in liquid fertilisers containing potassium is greatly limited by the low solubility of both potassium chloride and potassium sulphate which are the most common sources of fertiliser potassium. Potassium phosphates and particularly potassium polyphosphates are substantially more soluble than potassium chloride or potassium sulphate and are therefore of great potential importance in the field of liquid fertilisers. The source of fertiliser phosphorus in liquids is either phosphoric acid or ammonium phosphate. The direct application of phosphoric acid is normally impracticable. It is desirable at certain times of the year and on certain crops such as legumes to apply phosphorus and potassium without the simultaneous application of nitrogen. In this application potassium phosphates have advantages over ammonium phosphates, the current source of phosphate in liquid fertilisers. Potassium polyphosphates have the advantages of low salt index, high water solubility, extremely high plant food ($P_2O_5 + K_2O$) content, and freedom from chloride.

The presence of chloride is undesirable since it has a deleterious effect on some crops and soils.

The salt index of potassium phosphates is very considerably lower than that of either potassium chloride or potassium sulphate. Salt index is defined as the ratio of increase in osmotic pressure of the soil solution produced by the material to that produced by the same weight of nitrate of soda, based on a salt index of 100 for the latter material. Thus, the lower the salt index of a material the less likely it is to cause damage to seeds or plants.

The salt index of various compounds is as follows:

| KCl | 116.3 | $K_4P_2O_7$ | 16.5 | $KNO_3$ | 73.6 |
|---|---|---|---|---|---|
| $K_2SO_4$ | 46.0 | $K_5P_3O_{10}$ | 19.9 | | |
| $KH_2PO_4$ | 8.4 | $NH_4H_2PO_4$ | 29.9 | | |
| $K_2HPO_4$ | 17.4 | $(NH_4)_2HPO_4$ | 34.2 | | |

Thus, because of their low salt index, potassium phosphates are highly desirable for use as fertiliser materials.

Potassium phosphates can be obtained by the reaction of phosphoric acid with potassium chloride according to the well-known reaction:

$$KCl + H_3PO_4 \rightarrow KH_2PO_4 + HCl$$

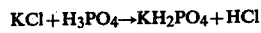

The removal of the hydrogen chloride quantitatively from the reaction mass is extremely difficult in practice, unless either high temperatures or a large excess of phosphoric acid are used. In the former case, the water insoluble potassium metaphosphate is preferentially formed and, in the latter case, the molar ratio of P to K is too high for most commercial fertilisers.

A number of workers have described methods for the elimination of chloride from potassium chloride by reaction with phosphoric acid. Many of these workers operated with a large excess of phosphoric acid. Ross et al. (U.S. Pat. No. 1,456,831; May 29, 1923) used a P to K mole ratio of 1.5 to 1. I.G. Farbenindustrie Aktiengesellschaft, (French Pat. No. 659,360 granted Feb. 4, 1929) used a P to K mole ratio of 2.

The addition of potassium sulphate, bisulphate or sulphuric acid has been proposed by a number of workers; for example I.G. Farbenindustrie Aktiengesellschaft cited above, Curless U.S. Pat. No. 3,554,729, Jan. 12, 1971 and Moore, U.S. Pat. No. 3,784,367, Jan. 8, 1974. The resulting potassium sulphate or bisulphate contained in the product improves the P to K mole ratio. The product is unsuitable for high analysis liquid fertilisers because of the low solubility of potassium sulphate.

The use of steam, air or an inert gas to assist in the removal of chloride is cited by both Ross and Curless, and Curless further suggests operating under reduced pressure.

Various temperatures have been recommended for the reaction of potassium chloride with phosphoric acid. Curless has found that the optimum temperature is below 200° C. Moore suggests a temperature range of 200° C. to 300° C. and Raistrick et al., U.K. Pat. No. 832,011; 1960 a temperature range of 400° C. to 500° C. Below 200° C. the proportion of polyphosphate formed is small while above 300° C. insoluble metaphosphate is preferentially formed.

It is a feature of the present invention that the reaction between potassium chloride and phosphoric acid can be carried out without the use of reduced pressure and without the addition of sulphuric acid. Other features of this invention are that any commercially available phosphoric or polyphosphoric acid may be used and that the reaction may be performed in equipment made from conventional materials of construction.

According to our invention we provide a process for the production of potassium polyphosphate in which potassium chloride and phosphoric acid or a polyphosphoric acid are reacted together in a molar ratio of phosphorus to potassium within the range of from about 1 to 1 to 1.25 to 1 inclusive. The reaction may be carried out in a single reactor or in a series of reactors. Air, steam or other inert gas is sparged into the reactor in the case of a single reactor or at least into the final reactor in the case of a multireactor system where the reactors are in series.

The temperature in the final reactor is maintained below about 300° C. preferably between about 200° C. and 300° C. and most preferably between 220° C. and 250° C. The temperatures of the other reactors, in a multi-reactor system may vary but the temperatures should increase from the first in the series which has the lowest temperature to the final reactor which has the highest temperature.

The process is operated at essentially atmospheric pressure and preferably at a slight negative pressure to facilitate the removal of the evolved steam and hydrogen chloride. However, the process can be operated under conditions of reduced pressure. It is a preferred embodiment of the invention that the process is operated at essentially atmospheric pressure to avoid the need for reinforced reactors and/or refrigerated hydrogen chloride condensers.

The product from the final reactor is dissolved rapidly in a cold unsaturated solution of liquid fertiliser or water and ammoniated to a pH between about 4.0 and 10.0. The liquid fertiliser produced is cooled and used directly as a suspension fertiliser or optionally filtered, the filtrate being used as the liquid fertiliser product. The solids filtered from the solution may be granulated, dried and used as a solid fertiliser. It is preferable to wash the solids prior to granulation and to use the washings as the solution of liquid fertiliser to dissolve the material from the final reactor.

While it is possible to operate the process of the invention using a single reactor for the potassium chloride/phosphoric acid reaction, it is a preferred embodiment of the invention that a series of reactors be used. These reactors may be individual vessels or a single vessel divided into compartments. The reactors, operated in series, can be operated at different temperatures and the heat transferred in the least expensive equipment compatible with the individual temperatures of each reactor.

It is found that, using 54% $P_2O_5$ phosphoric acid feed and P to K mole ratio of about 1.15 to 1, in excess of 60% of the reaction takes place below about 180° C. and over 80% of the heat requirement can be supplied below about 180° C. Heat exchangers made in conventional materials such as, but not limited to, graphite can be used without corrosion problems for the reactors operating below about 180° C. using steam as the heating medium. The heat input to the final reactor operating in the most preferred region of about 220° C. to 250° C. can be accomplished by sparging superheated steam, hot air or a hot inert gas into the reaction medium. Conventional heat exchangers can be used but are expensive for the conditions prevailing in the final reactor.

Sparging with steam, air or an inert gas accomplishes two objectives in both supplying heat and facilitating the removal of chloride. The choice of sparge gas depends on the desired strength of the hydrochloric acid produced as by-product. Where the strength of the hydrochloric acid is unimportant or where the feed phosphoric acid is sufficiently concentrated superheated steam is the preferred sparge gas because it can be condensed easily with the hydrochloric acid. Where concentrated hydrochloric acid is required, air or another inert gas is preferred. An important added advantage of the use of steam however, is the hydrolysis of any chlorophosphates formed which facilitates the removal of residual chloride from the reaction mass.

The chloride content of the material leaving the final reactor is maintained below about 2.5% and preferably below about 1.5%. The chloride content is affected by the P to K mole ratio, temperature, residence time and degree of sparging. At a temperature of about 220° C. in the final reactor a P to K mole ratio of about 1.25 to 1 is preferably used, and at about 250° C. a P to K mole ratio of about 1.1 to 1 is preferably used. The amount of sparging required to transfer the required amount of heat in the final reactor is adequate to give a sufficiently low chloride level when the sparge gas temperature is below about 700° C.

The product from the final reactor is dissolved either in water or a weak solution of a liquid fertiliser, preferably a recycle stream of liquid fertiliser. The chloride content of the liquid product is below about 1.5% and preferably below about 1% by weight.

The liquid fertilisers produced by this invention contain greater than about 60% of the phosphate in the form of polyphosphates. The degree of polymerisation is dependent particularly on the final temperature and the residence time at that temperature. Potassium polyphosphates are generally more soluble than their equivalent orthophosphates provided metaphosphates are not present. The material manufactured by this process is considerably more soluble than the monomeric potassium dihydrogen phosphate. One of the advantages of the invention, therefore, is the high polyphosphate content of the product. The polyphosphates are not stable at low pH solutions. It is an integral part of the invention to increase the pH value of the solution within the range of from about 4 to 10 by the addition of ammonia or the hydroxide or carbonate of an alkali metal such as potassium or sodium, ammonia is preferred on the grounds of economics and agronomic usefulness but potassium carbonate or hydroxide may be used in special circumstances. An added advantage of the increased pH of the solution is the reduced corrosivity. This simplifies the choice of materials of construction and allows greater ease of handling.

It is important in the manufacturing process to maintain the temperature at a low level in order to minimise the hydrolysis of the polyphosphates to orthophosphate. The liquid fertiliser produced is cooled in a heat exchanger, cooling tower or other suitable equipment. Alkali or ammonia can be added before or after the cooler and by maintaining a high recirculation rate through the dissolver and cooler circuit it is possible rapidly to cool and dissolve the material coming from the final reactor and to remove the heat liberated by the addition of ammonia or alkali. The temperature throughout this circuit is kept below about 80° C. and preferably below about 60° C.

The analysis of the liquid fertilisers produced will vary with the degree of polymerisation of the phosphate, with the P to K mole ratio and with the degree of ammoniation. Liquid fertilisers analysing 2-39-22 have been made in very carefully controlled conditions. Materials with analysis 2-31-17 and 6-27-15 have been consistently made in pilot plant equipment and show very good stability.

The materials 2-31-17 and 6-27-15 have pH values of about 6.5 and about 9 respectively at which values the product has been shown to have solubility peaks. The pH value can be adjusted to any required level within the range of about 4 to 10.

The stream from the ammonia or alkali addition vessel contains some solids which may be separated by any suitable means such as a filter or centrifuge. The wet solids separated from the liquid fertiliser contain about 5% by weight of the $P_2O_5$ and $K_2O$ fed to the system. The exact quantity depends on the purity of the raw materials used and the dryness of the separated solids. Where a filter is used, the filter cake can be easily washed. The amount of water required for the liquid fertiliser is many times greater than the quantity of the separated solids and all this water can be used to wash the filter cake and the washings used as a weak solution of liquid fertiliser to dissolve the product from the final reactor. The remaining wet solids contain 1-2% of the $P_2O_5$ and $K_2O$ in the raw material feeds, when phosphoric acid made from Moroccan Phosphate Rock is used or 2-5% where Florida phosphate rock is the starting material. The quantity of $P_2O_5$ and $K_2O$ remaining is dependent on the purity of the phosphoric acid feed. Acids with high levels of iron and magnesium will cause higher levels of $P_2O_5$ and $K_2O$ in the washed filter cake. Because of the residual nutrient content the solids may be granulated separately or with other materials to yield valuable fertilisers.

The phosphoric acid used for the process can be any commercial grade of phosphoric acid ranging from the unconcentrated wet process acid containing about 30% $P_2O_5$ to the superphosphoric acids containing up to about 76% $P_2O_5$.

The product of this invention can be used to produce suspension fertilisers of very high analysis.

One method of operating the process is shown in the accompanying drawing which is a flow sheet illustrating one embodiment of the process according to the invention.

Potassium chloride and phosphoric acid are fed at the correct flow rates to a first reactor 1. Material is pumped from reactor 1 by a pump 4 through a heater 5 and back into said reactor 1. The material in reactor 1 is maintained at a constant predetermined temperature by this means. Material from reactor 1 flows to a reactor 2 which is maintained at a predetermined temperature by pumping material from said reactor 2 by a pump 6 through a heater 7. Material from said reactor 2 flows to a reactor 3 where a predetermined temperature is maintained by sparging superheated steam or air from 8 into the reaction mass in said reactor 3. Material from reactor 3 flows to a dissolving tank 11 where ammonia from 10 is added to maintain a predetermined pH value. The desired temperature level in tank 11 is maintained by pumping material from tank 11 through a cooler 13 by means of a pump 12 back to the dissolving tank 11. Part of the material from the dissolving tank 11 is pumped by a pump 12 to a filter 15 and the filtrate 17 is the liquid fertiliser product. The solids on the filter are washed with water 14 and the washings 18 are recycled to the dissolving tank 11. The washed solid 16 is removed as a by-product. The amount of wash water 14 is limited to that required for the liquid fertiliser. If less than the required amount is used additional water may be added to the dissolving tank 11. The vapours and gases from reactors 1, 2 and 3 are passed by a fan 19 through a condenser, absorber and tail gas scrubber 9. A small amount of water 20 is fed to the tail gas scrubber and absorber 9. By-product hydrochloric acid is removed at 21.

The following specific Examples are presented by way of illustration.

EXAMPLE 1

Fertiliser grade potassium chloride (Muriate of Potash 60% $K_2O$) and wet process phosphoric acid (51.2% $P_2O_5$) were fed continuously to a reactor in such proportions as to maintain a P to K mole ratio of 1.15 to 1. This first reactor was maintained at a temperature of 105° C. and material from this reactor overflowed to a second reactor where the temperature was maintained at 175° C. Material from the second reactor overflowed to a final reactor which was maintained at 250° C. The final reactor was sparged with air. The gases evolved from the reactors were cooled and scrubbed with water to yield a by-product hydrochloric acid containing 25.8% HCl by weight.

Material from the final reactor overflowed to a dissolving vessel which was fed simultaneously with a large flow of recycle fertiliser solution at about 40° C. The recycle flow was about 20 times the flow from the reactor. Material from the dissolver flowed to a further vessel where ammonia was added to adjust the pH value of the solution to pH 6.5. The solution was then fed to a cooling tower. A product stream from the cooling tower was fed to a filter and the remainder was recycled to the dissolver. After filtration the solids were washed on the filter and the washings fed to the dissolver. The filtrate analysed 2% N, 31% $P_2O_5$, 17% $K_2O$ and 0.86% Cl.

The quantity of water used to wash the solids on the filter was adjusted to maintain a product which contained 31% $P_2O_5$.

The phosphoric acid used was manufactured from Moroccan phosphate rock.

EXAMPLE 2

Fertiliser grade potassium chloride (Muriate of Potash) analysing 60.8% $K_2O$ was reacted with wet process phosphoric acid which had been concentrated to 58.8% $P_2O_5$ in such proportions as to give a P:K mole ratio of 1.25:1. The reaction was performed at 220° C. When efferverscence had ceased the mixture was divided into two parts and one was sparged with air for 180 minutes and the other remained unsparged. Both portions were maintained at 220° C. for the 180 minutes. The chloride in the reaction product analysed
Air sparged—1.51%
Unsparged—3.48%
The phosphoric acid used was manufactured from Moroccan Phosphate rock.

EXAMPLE 3

Fertiliser grade potassium chloride (Muriate of Potash) analysing 60.8% $K_2O$ was reacted with wet process phosphoric acid which had been concentrated to 54.7% $P_2O_5$ in such proportions as to give a P:K mole ratio of 1.22:1. The reaction was performed at 245° C. When effervescence had ceased the mixture was sparged with air for 180 minutes. The chloride in the reaction product analysed 1.89%. The phosphoric acid used was manufactured from Florida phosphate rock.

EXAMPLE 4

Fertiliser grade potassium chloride (Muriate of Potash 60.8% $K_2O$) and wet process phosphoric acid (54.7% $P_2O_5$ made from Florida phosphate rock) were fed continuously to a reactor in such proportions as to maintain a P to K mole ratio of 1.23 to 1. The first reactor was maintained at a temperature of 110° C. and material from this reactor overflowed to a second reactor where the temperature was maintained at 165° C. Material from the second reactor overflowed to a final reactor which was maintained at 250° C. The final reactor was sparged with air. The gases evolved from the reactors were cooled and scrubbed with water to yield a byproduct hydrochloric acid containing 25.2% HCl by weight.

Material from the final reactor overflowed to a dissolving vessel which was fed simultaneously with a large flow of recycle fertiliser solution at about 40° C. The recycle flow was about 20 times the flow from the reactor. Material from the dissolver flowed to a further vessel where ammonia was added to adjust the pH value of the solution to pH 6.5. The solution was then fed to a cooling tower. A product stream from the cooling tower was fed to a filter and the remainder was recycled to the dissolver. After filtration the solids were washed on the filter and the washings fed to the dissolver. The filtrate analysed 3% N, 30% $P_2O_5$, 16% $K_2O$ and 0.78% Cl.

The quantity of water used to wash the solids on the filter was adjusted to maintain a product which contained 30% $P_2O_5$.

We claim:

1. A process for the production of a potassium polyphosphate based liquid fertilizer which comprises:
   (a) reacting potassium chloride with a compound selected from the group consisting of phosphoric acid and polyphosphoric acid in a molar ratio of phosphorus to potassium in the range of from about 1:1 to 1.25:1 at a temperature below 300° C. while simultaneously blowing a gas selected from the group consisting of steam, air and inert gases through the reaction medium;
   (b) removing the liberated hydrogen chloride;
   (c) recovering a potassium polyphosphate reaction product;
   (d) adding said reaction product to a weak solution of liquid fertilizer of water in a dissolving vessel;
   (e) adjusting the pH value of the resulting solution to from about 4.0 to 10.0;
   (f) cooling the pH-adjusted solution; and
   (g) filtering the cooled solution to yield said liquid fertilizer and a solid by-product;
   wherein the reaction in step (a) is carried out in a multicompartment reactor system in which the temperature in the first compartment thereof is the lowest and the temperature in the final compartment thereof is the highest.

2. The process of claim 1 wherein the temperature in the final compartment of said reactor system is maintained between 220 and 280° C.

3. The process of claim 2 wherein the final compartment temperature is maintained between 220 and 250° C.

4. The process of claim 3 wherein the temperature of the penultimate compartment is about 150° to 185° C.

5. The process of claim 2 wherein the temperature of the penultimate compartment is about 150 to 220° C.

6. The process of claim 1 wherein the gas used in step (a) is steam, said steam being superheated.

7. The process of claim 1 comprising the further steps of washing the solid by-product of step (g) with water and then recycling the resulting washings to said dissolving vessel to supply said weak solution of liquid fertilizer.

8. The process of claim 1 wherein said phosphoric acid has a $P_2O_5$ content in the range of from about 30% to 76%.

9. The process of claim 1 wherein said phosphoric acid has a $P_2O_5$ content in the range of from about 38% to 56%.

10. The process of claim 1 wherein said molar ratio of phosphorus to potassium is from about 1.1:1 to 1.2:1.

11. The process of claim 1 wherein said gas selected from the group consisting of steam, air and inert gases is blown through at least the final compartment of said multicompartment reactor system.

12. The process of claim 1 wherein said gas selected from the group consisting of steam, air and inert gases is blown through the reaction medium to assist in the removal of chloride and to supply at least a portion of the heat required.

13. The process of claim 1 wherein the pH adjustment is by the addition of a compound selected from the group consisting of ammonia, alkali metal or ammonium hydroxides, and alkali metal or ammonium carbonates.

14. The process of claim 13 wherein part of the product stream from the cooler is recycled to the dissolving vessel at a sufficient rate to maintain the temperature in the dissolving vessel below about 80° C., and wherein the remaining part of the stream from the cooler is sent after clarification to product storage.

15. The process of claim 14 wherein the temperature in the dissolving vessel is maintained below about 60° C.

16. The process of claim 1 wherein said liquid fertilizer product has a chloride content of less than about 1.5%.

17. The process of claim 1 wherein said liquid fertilizer product has a chloride content of less than about 1%.

18. The process of claim 1 wherein the liquid fertilizer product contains at least about 60% of the phosphate in the form of polyphosphate.

19. The process of claim 1 wherein said liquid fertilizer product contains at least about 70% of the phosphate in the form of polyphosphate.

20. The process of claim 1 wherein said liquid fertilizer product has a pH of between about 6 and 7.

21. The process of claim 1 wherein said liquid fertilizer value has a pH between about 8.5 and 9.5.

* * * * *